US007868931B2

(12) United States Patent
Fujita

(10) Patent No.: US 7,868,931 B2
(45) Date of Patent: Jan. 11, 2011

(54) DATA RECORDING APPARATUS AND CONTROL METHOD

(75) Inventor: Shunji Fujita, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 817 days.

(21) Appl. No.: 11/780,986

(22) Filed: Jul. 20, 2007

(65) Prior Publication Data

US 2008/0025160 A1 Jan. 31, 2008

(30) Foreign Application Priority Data

Jul. 27, 2006 (JP) .............................. 2006-205323

(51) Int. Cl.
*H04N 5/76* (2006.01)
(52) U.S. Cl. .................................. 348/231.2
(58) Field of Classification Search ............ 348/231.99, 348/231.1–231.3, 231.7–231.9
See application file for complete search history.

(56) References Cited

U.S. PATENT DOCUMENTS 6,816,190 B1 * 11/2004 Miyazawa ............... 348/231.6

2005/0036043 A1 * 2/2005 Nakama ................. 348/231.99
2005/0046709 A1 * 3/2005 Nagai ....................... 348/231.8
2005/0134704 A1 * 6/2005 Uryu et al. ................ 348/231.7
2005/0174443 A1 * 8/2005 Niimura et al. .......... 348/231.2
2006/0152602 A1 * 7/2006 Koba et al. ............. 348/231.99

FOREIGN PATENT DOCUMENTS

JP 2001-036786 A 2/2001

* cited by examiner

*Primary Examiner*—Tuan Ho
(74) *Attorney, Agent, or Firm*—Canon USA Inc IP Division

(57) ABSTRACT

At least one exemplary embodiment is directed to a data recording apparatus including: a first recording control unit configured to control recording of data on a first recording medium connected to the data recording apparatus; and a second recording control unit configured to control recording of data on a second recording medium connected to the data recording apparatus. In the data recording apparatus, the first recording control unit inhibits writing of data in a free space of a predetermined size included in the first recording medium when it is detected that the second recording medium is connected to the data recording apparatus, and permits writing of data in the free space when data cannot be recorded on the second recording medium.

8 Claims, 8 Drawing Sheets

DATA RECORDING APPARATUS AND CONTROL METHOD

BACKGROUND OF THE INVENTION

1. Field of the Invention

The present invention relates to a recording apparatus capable of recording captured image data in a predetermined recording area and a control method therefor.

2. Description of the Related Art

In recent years, a digital camera has been widely used. With respect to such a digital camera, a quality of an image has greatly improved, that is, a number of pixels constituting the image data has greatly increased owing to the development of a charge-coupled device (CCD). Thus, the data amount (size) of one image data has increased.

Therefore, while a digital camera using a memory card such as a nonvolatile flash read-only memory (ROM) as a recording medium is limited in recording capacity, memory cards having a larger recording capacity have been successively developed and marketed. Furthermore, an electronic camera including a hard disk device or a magneto-optical disk device, which can record image data of a larger size, has been developed (Japanese Patent Application Laid-Open No. 2001-036786).

Moreover, a hard disk product corresponding to a general digital interface such as a universal serial bus (USB) and Institute of Electrical and Electronic Engineers (IEEE) 1394 has been successively developed and marketed. Such a hard disk product can be connected to a digital camera main body with a cable as an extension unit.

However, in the case where, for example, a digital camera and a USB-corresponding hard disk, which has been recently marketed, are connected to each other with a USB cable, various problems come up. For example, a cable may be suddenly disconnected due to a user's operation or vibration during shooting. In this case, captured image data cannot be recorded, and thus a photographer can miss an important photo opportunity.

SUMMARY OF THE INVENTION

The present invention is directed to a data recording apparatus capable of continuing a data recording operation even when data cannot be recorded on a recording medium that is set to be a data recording destination.

According to an aspect of the present invention, a data recording apparatus is provided which includes a first recording control unit configured to control recording of data on a first recording medium connected to the data recording apparatus; and a second recording control unit configured to control recording of data on a second recording medium connected to the data recording apparatus. In the data recording apparatus, the first recording control unit inhibits writing of data in a free space of a predetermined size included in the first recording medium when it is detected that the second recording medium is connected to the data recording apparatus, and permits writing of data in the free space when data cannot be recorded on the second recording medium.

According to another aspect of the present invention, a method for controlling a data recording apparatus, the method includes controlling recording of data on a first recording medium connected to the data recording apparatus, controlling recording of data on a second recording medium connected to the data recording apparatus, inhibiting writing of data in a free space of a predetermined size included in the first recording medium when the second recording medium is connected to the data recording apparatus, and permitting writing of data in the free space when data cannot be recorded on the second recording medium.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DETAILED DESCRIPTION OF THE EMBODIMENTS

Various exemplary embodiments, features, and aspects of the present invention will now herein be described in detail with reference to the drawings. It is to be noted that the relative arrangement of the components, the numerical expressions, and numerical values set forth in these embodiments are not intended to limit the scope of the present invention unless it is specifically stated otherwise.

First Exemplary Embodiment

Figure 1:
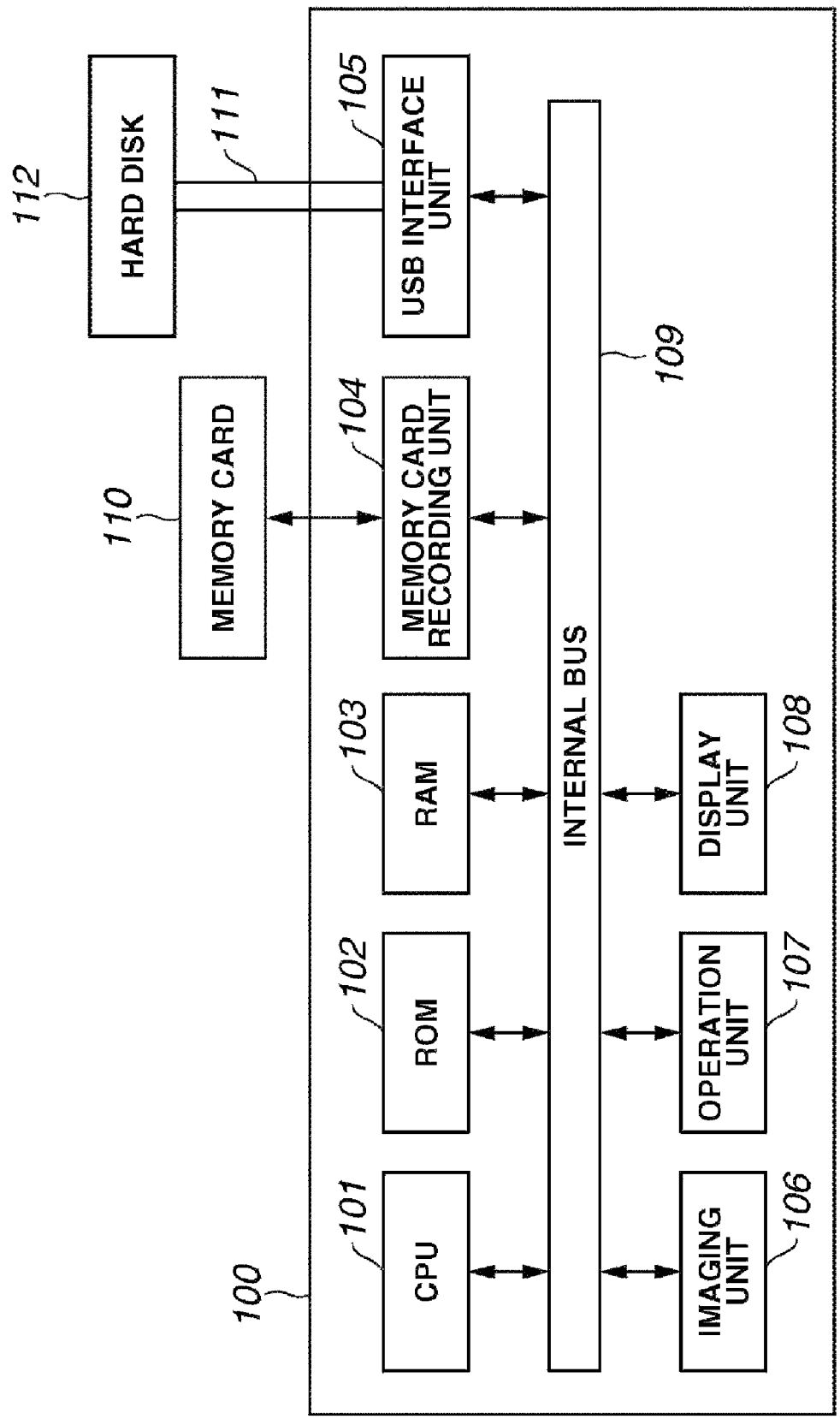
FIG. 1 illustrates an example configuration of a digital camera according to a first exemplary embodiment of the present invention.

Now, a first exemplary embodiment of the present invention will be described below. FIG. 1 illustrates a configuration of a digital camera 100 according to the first exemplary embodiment of the present invention. The digital camera 100 includes a central processing unit (CPU) 101, a read-only memory (ROM) 102, a random access memory (RAM) 103, an imaging unit 106, a memory card recording unit 104, a USB interface unit 105, an operation unit 107, and a display unit 108. These units are connected with each other via an internal bus 109.

The CPU 101 operates according to a program stored on the ROM 102 to control various operations of the digital camera 100. The ROM 102 is a nonvolatile memory in which a program for controlling the digital camera 100 is previously stored.

The RAM 103 temporarily buffers digital image data output from the imaging unit 106. The RAM 103 temporarily stores data to be written on a memory card 110 that is mounted via the memory card record unit 104, and on a hard disk 112 that is mounted via the USB interface unit 105. Further, the RAM 103 temporarily stores data read out from a memory card 110 mounted via the memory card record unit 104, and the hard disk 112 mounted via the USB interface unit 105. Moreover, the RAM 103 functions as a work area for computation by the CPU 101 and an area for temporally storing various settings.

The memory card recording unit 104 is physically and electrically connected to a memory card 110. The memory card 104 writes captured digital image data on the memory card 110 and reads stored image data from the memory card 110.

The USB interface unit 105 is physically and electrically connected to the hard disk 112 via a USB cable 111. The USB interface unit 105 writes captured digital image data on the hard disk 112 and reads stored image data from the hard disk 112. Furthermore, the USB interface unit 105 detects a connecting state of the USB cable 111.

The imaging unit 106 includes a lens for image-forming of a light incident into the lens, a photoelectric converter (a CCD and a complementary metal oxide semiconductor (CMOS) sensor) for converting the image-formed light into an electrical signal, an analog-digital converter (AD converter) for converting an analog electrical signal output from the photoelectric converter into a digital signal.

The operation unit 107 includes various buttons, dials, and switches. More specifically, the operation unit 107 includes, for example, a photographing button for instructing photographing, a mode selection button for selecting an operation mode of the digital camera 100, a menu button for calling a menu item, and a button for selecting and instructing a menu item. The operation unit 107 outputs a state and a state change of these buttons, dials, and the switches as an electrical signal.

The display unit 108 includes a liquid crystal display device. The digital camera 100 includes also blocks such as a power circuit in addition to the above-described units. However, description about blocks other than processing blocks according to the present invention are omitted here.

Now, a shooting and recording mode in the digital camera 100 will be described. The digital camera 100 includes three shooting and recording modes according to recording destinations of photographing data, that is, a memory card recording mode, a hard disk recording mode, and a simultaneous recording mode.

In the memory card recording mode, a memory card recording unit 104 records on the memory card 110 digital image data output by the imaging unit 106 and expanded onto the RAM 103. In the hard disk recording mode, the USB interface unit 105 transmits and records digital image data expanded onto the RAM 103 to the hard disk 112 using a USB protocol. In the simultaneous recording mode, the recording on the memory card 110 and the recording on the hard disk 112 are simultaneously performed. A user can designate and switch among these three modes. The user can shift the modes by performing inputting via the operation unit 107.

Figure 2:
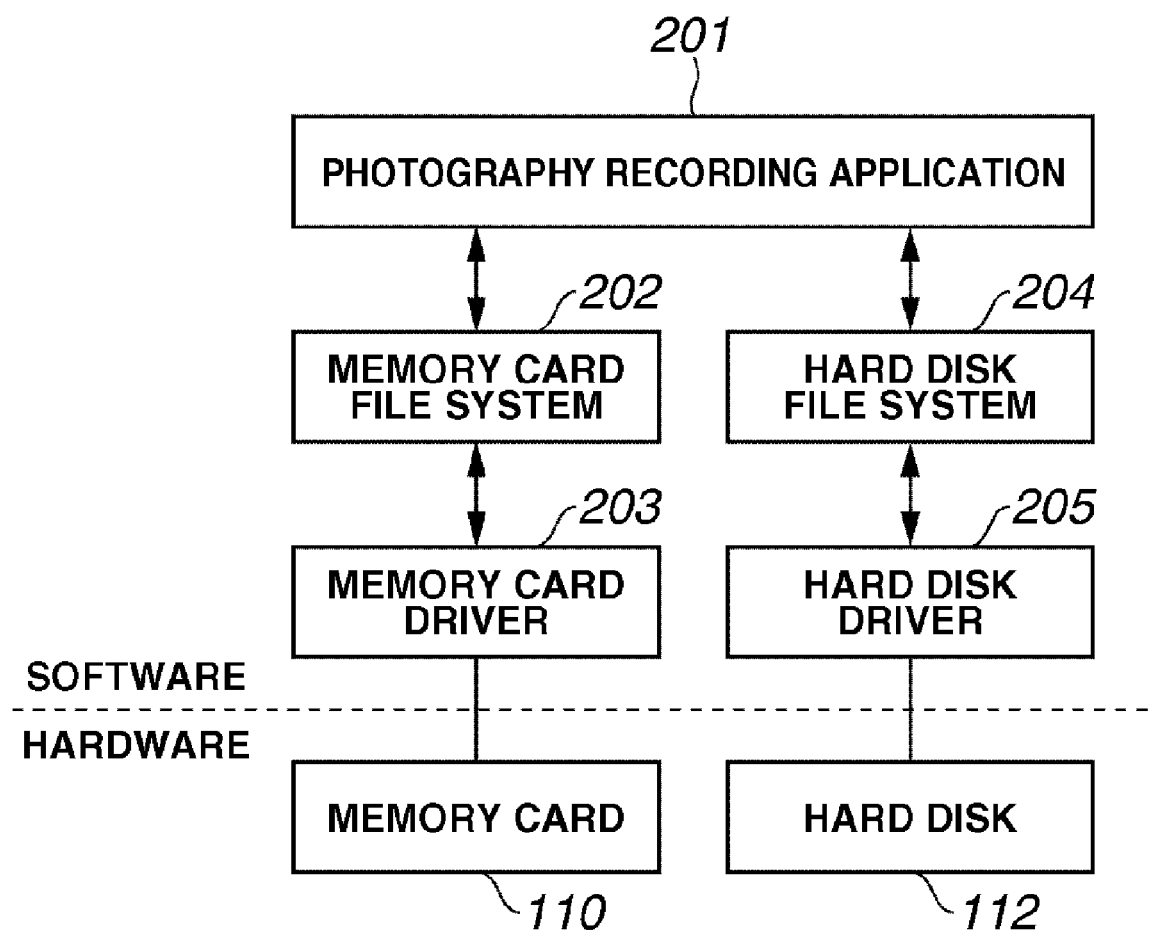
FIG. 2 illustrates an example module configuration of software relating to processing for recording captured digital image data according to the first exemplary embodiment of the present invention.

FIG. 2 illustrates a module configuration of software relating to processing for recording captured digital image data according to the present exemplary embodiment. A shooting and recording application 201 is called by the CPU 101 when the imaging unit 106 performs imaging processing. The shooting and recording application 201 writes digital image data expanded onto the RAM 103 into a file system. An instruction to shift to a shooting and recording mode via the operation unit 107 is set to the shooting and recording application 201 which performs recording according to the setting.

A memory card file system 202 manages file and directory information of digital image data recorded on the memory card 110. Further, the memory card file system 202 writes and reads data per file and per directory on and from a memory card driver 203 according to an instruction from the shooting and recording application 201.

The memory card driver 203 is a module that detects connection of the memory card 110, and reads and writes data according to an instruction from the memory card file system 202.

A hard disk file system 204 manages file and directory information of digital image data recorded on the hard disk 112. Further, the hard disk file system 204 writes and reads data per file and per directory on and from a hard disk driver 205 according to an instruction from the shooting and recording application 201.

The hard disk driver 205 is a module that detects connection of the USB cable 111, that is, the hard disk 112. The hard disk driver 205 reads and writes data according to an instruction from the hard disk file system 204.

Now, with reference to FIG. 3, processing is described below which is performed when the memory card 110 is connected to the digital camera 100 during the memory card recording mode, and the USB cable 111, namely, the hard disk 112, is connected to the digital camera 100.

Figure 3:
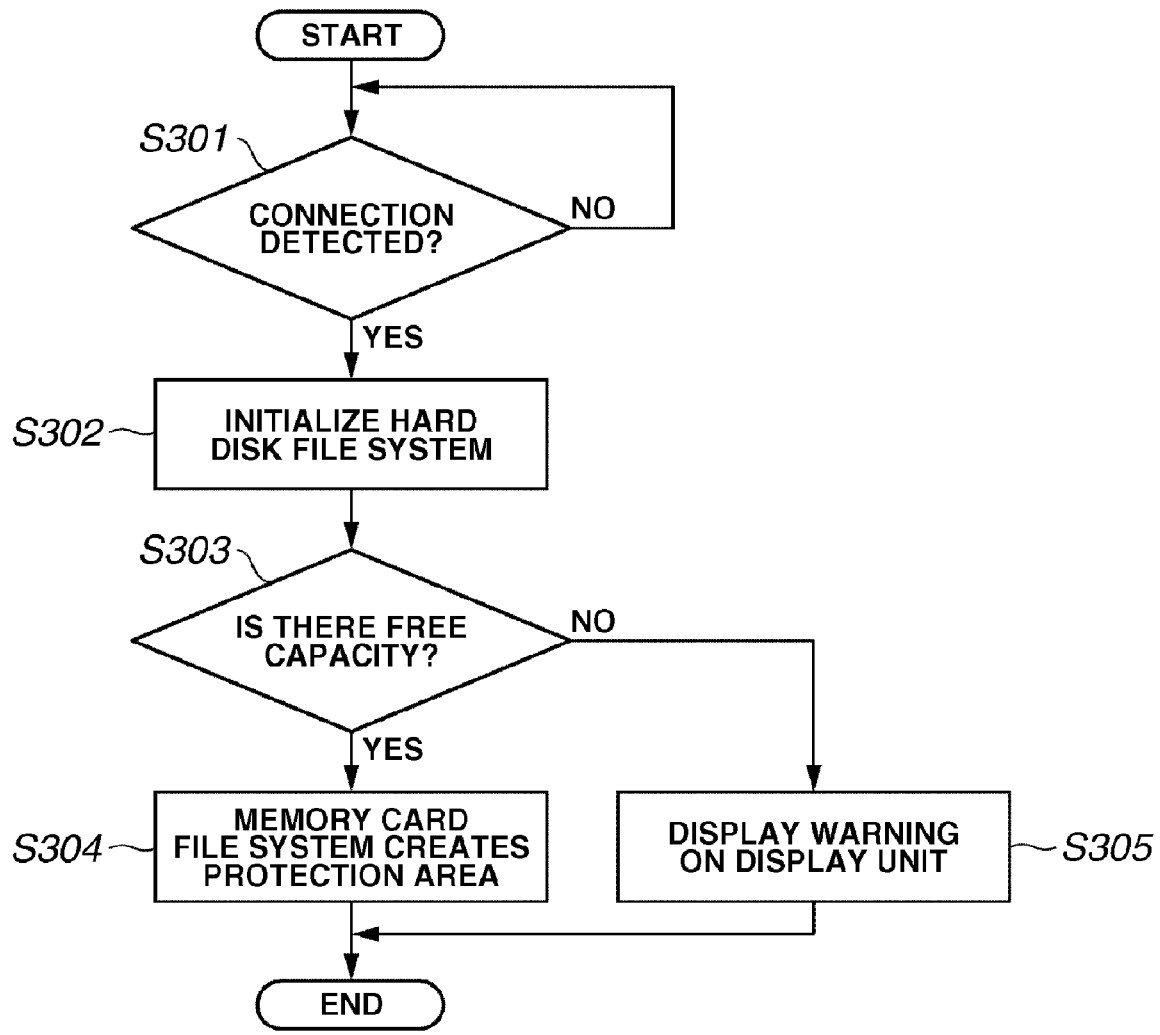
FIG. 3 is a flow chart illustrating example processing performed when a hard disk is connected to a digital camera according to the first exemplary embodiment of the present invention.

Referring to FIG. 3, in step S301, the CPU 101 detects mounting of the hard disk 112. When the USB cable 111 is physically and electrically connected to the digital camera 100, interrupt occurs via a USB interface circuit (not illustrated), and the hard disk driver detects that the hard disk 112 is connected to the digital camera 100.

In step S302, a hard disk file system 204 performs initialization processing according to a notification from the hard disk driver 205. That is, the hard disk file system 204 acquires information from the hard disk 112, reads the entire capacity and directory information of the hard disk 112 to initialize the file system. The digital camera 100 can automatically shift from the shooting and recording mode to the hard disk recording mode or the simultaneous recording mode when the hard disk 112 is connected.

In step S303, the memory card file system 202 determines whether a free capacity large enough to be set as a protection area exists in a memory card 110, according to an instruction from the hard disk file system 204. The free capacity indicates the capacity of the recordable area (free space) on the recording medium.

If it is determined in step S303 that a free capacity large enough to be set as a protection area exists in a memory card 110 (YES in step S303), the hard disk file system 204 sets to the memory card file system 202 a free space of the memory card 110 having an amount of 64 megabytes which is an area onto which recording is inhibited. As will be described below, the area is a protection area for recording photographing data in case the hard disk 112 is suddenly disconnected during shooting. The processing for creating a protection area by setting a writing area in step S304 can also be performed when the digital camera 100 shifts to the hard disk recording mode or the simultaneous recording mode. Further, the digital camera 100 can also create a protection area when it is detected that digital image data is of a size with which the digital image data can be recorded, by referring to the free capacity amount of the hard disk 112.

The memory card file system 202 performs initialization when the memory card 110 is mounted on the digital camera 100 or when the memory card file system 202 receives a command for initialization from a higher-order application. At this time, the memory card file system 202 acquires file information (for example, a file allocation table) from the memory card 110. Further, the memory card file system 202 acquires also information about the entire capacity and a free capacity of the memory card 110.

In step S304, the memory card file system 202 only subtracts 64 megabytes from the amount information about the free capacity of the memory card 110 managed by the memory card file system 202. The memory card file system 202 does not perform any processing on the memory card driver 203 and the memory card 110. Accordingly, in relation to the higher-order shooting and recording application 201, the actual free capacity of the memory card 110 appears to have decreased. In the present exemplary embodiment, the capacity to be set as the protection area is 64 megabytes. However, the present exemplary embodiment is not limited to this, and the capacity to be set as a protection area can be arbitrarily designated.

Further, in step S304, the display unit 108 can notify to a user that the hard disk 112 has been connected.

On the other hand, if it is determined in step S303 that no free capacity exists in the memory card 110 and a protection area cannot be secured (NO in step S303), the CPU 101 advances to step S305. In step S305, the display unit 108 displays a warning message to notify the user that no protection area has been created in the memory card 110. The series of operations performed when the hard disk 112 is connected is as described above. When a recording inhibition area is set in step S303, the capacity of captured digital image data recordable by the shooting and recording application 201 on the memory card 110 is reduced.

Now, with reference to FIG. 4, processing is described below which is performed if the USB cable 111 is disconnected during the hard disk recording mode or the simultaneous recording mode of the digital camera 100 when a protection area has been created in the memory card 110.

Figure 4:
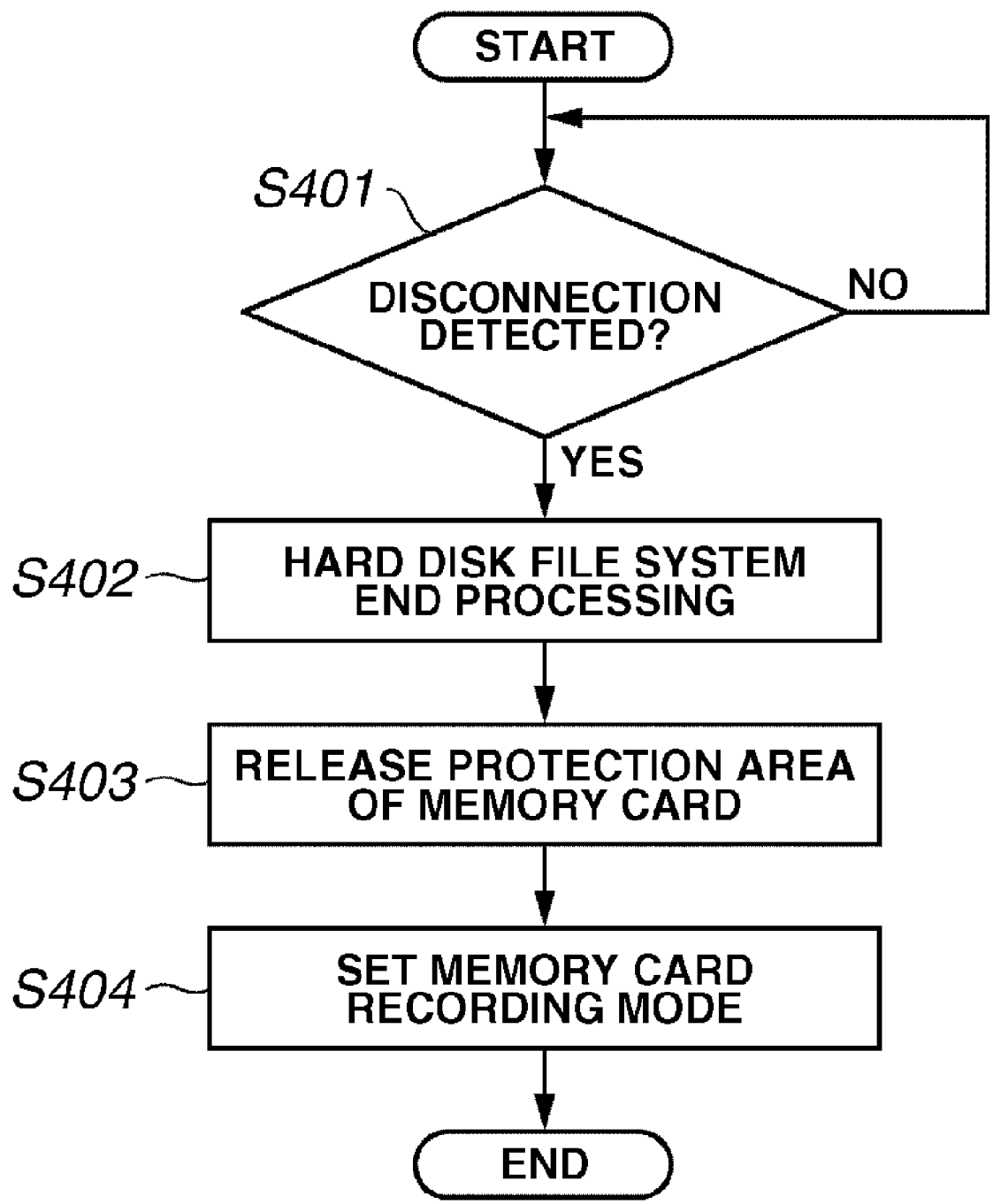
FIG. 4 is a flow chart illustrating processing performed when the hard disk is disconnected from the digital camera according to the first exemplary embodiment of the present invention.

Referring to FIG. 4, in step S401, the CPU 101 detects whether the hard disk 112 has been disconnected. The processing in step S401 is similar to the processing in step S301. That is, when the USB cable 111 is physically and electrically disconnected, interrupt occurs via the USB interface circuit. The hard disk driver 205 detects that the hard disk 112 has been disconnected.

In step S402, the hard disk file system 204 deallocates allocation information about a file and a directory according to the notification from the hard disk driver 205 and performs processing for ending the file system.

In step S403, the hard disk file system 204 releases the protection area of the memory card file system 202. The memory card file system 202 only adds 64 megabytes to the amount information about the free capacity of the memory card 110 managed by the memory card file system 202. The memory card file system 202 does not perform any processing on the memory card driver 203 and the memory card 110. Accordingly, in relation to the higher-order shooting and recording application 201, the actual free capacity of the memory card 110 appears to have increased.

Subsequently, in step S404, the shooting and recording application 201, after receiving the notification of disconnection of the hard disk 112, shifts from the shooting and recording mode to the memory card recording mode. The series of operations performed when the USB interface cable 111 is disconnected is as described above. Thus, even when the USB cable 111 is disconnected during the hard disk recording mode, the shooting and recording application 201 can surely record digital image data captured after the USB cable 111 is disconnected, in the protection area of the memory card 110.

Second Exemplary Embodiment

Now, a second exemplary embodiment of the present invention will be described below. In the first exemplary embodiment, the digital camera 100 includes one memory card 110. However, the present invention can be applied to a case where the digital camera 100 includes a plurality of recording media in addition to the hard disk 112. In the second exemplary embodiment, an example is described in which a memory card A503 and a memory card B504 can be mounted on the digital camera 100.

Figure 5:
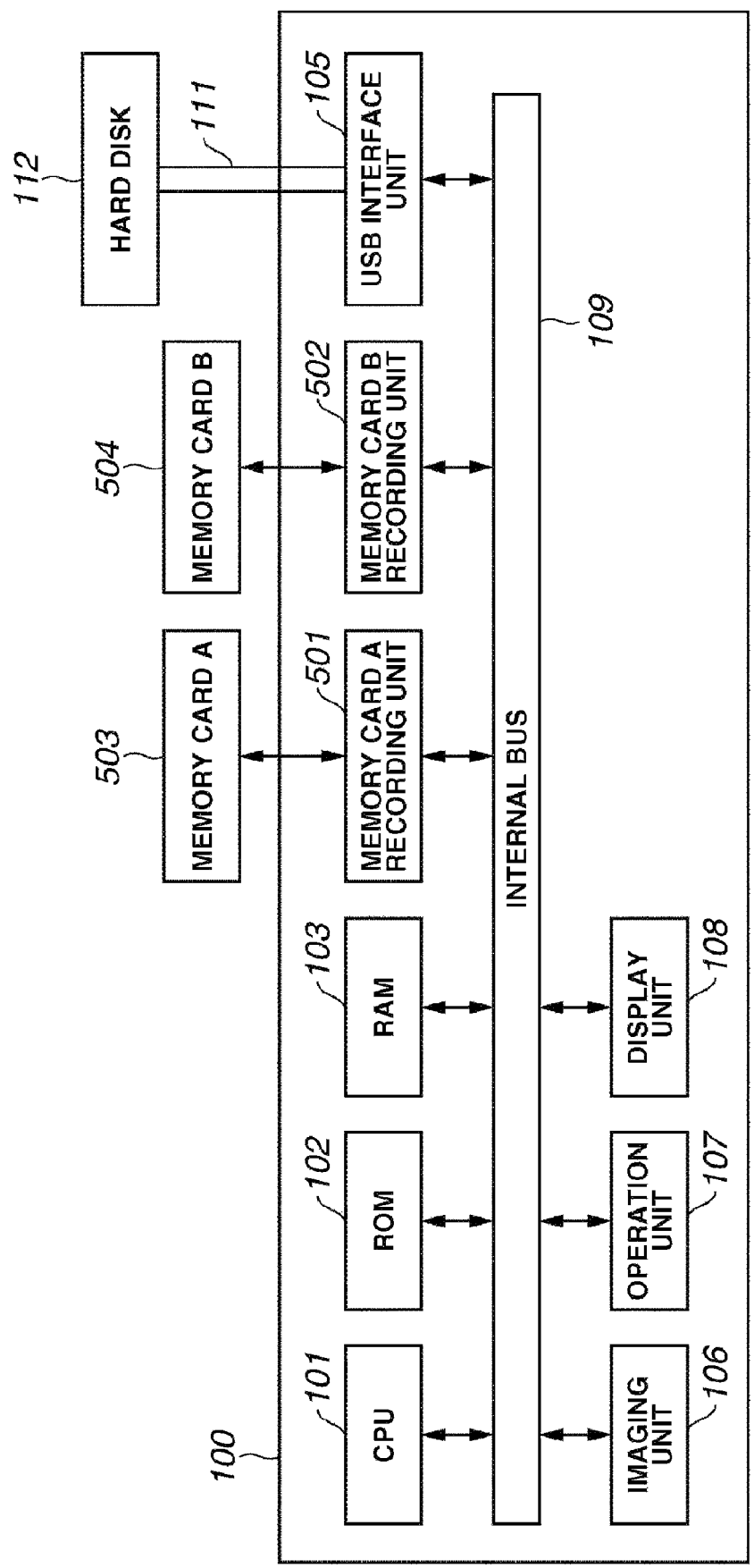
FIG. 5 illustrates an example configuration of the digital camera according to a second exemplary embodiment of the present invention.

FIG. 5 illustrates a configuration of the digital camera 100 according to the second exemplary embodiment of the present invention. A memory card "A" recording unit 501 is physically and electrically connected to the memory card "A" (reference numeral 503). The memory card A recording unit 501 writes captured digital image data on the memory card 503 and reads image data stored on the memory card 503. Similarly, a memory card "B" recording unit 502 is physically and electrically connected to the memory card "B" (reference numeral 504). The memory card B recording unit 502 writes captured digital image data on the memory card 504 and reads image data stored on the memory card 504. The other blocks operate similar to those of the first exemplary embodiment.

Now, the shooting and recording mode of the digital camera 100 will be described below. The digital camera 100 includes five shooting and recording modes according to recording destinations of photographing data, that is, a memory card A recording mode, a memory card B recording mode, the hard disk recording mode, a memory card A and hard disk simultaneous recording mode, and a memory card B and hard disk simultaneous recording mode.

In the memory card A recording mode, the memory card A recording unit 501 records on the memory card 503 digital image data output by the imaging unit 106 and expanded on the RAM 103. In the memory card B recording mode, the memory card B recording unit 502 records digital image data on the memory card 504. In the hard disk recording mode, the USB interface unit 105 transmits and records digital image data to and on the hard disk 112 using a USB protocol. In the memory card A and hard disk simultaneous recording mode, recording of digital image data on the memory card 503 and recording of digital image data on the hard disk 112 are simultaneously performed. In the memory card B and hard disk simultaneous recording mode, recording of digital image data on the memory card 504 and recording of digital image data on the hard disk 112 are simultaneously performed. A user can designate and switch among the five modes. The user can shift among the five modes by performing inputting via the operation unit 107.

Figure 6:
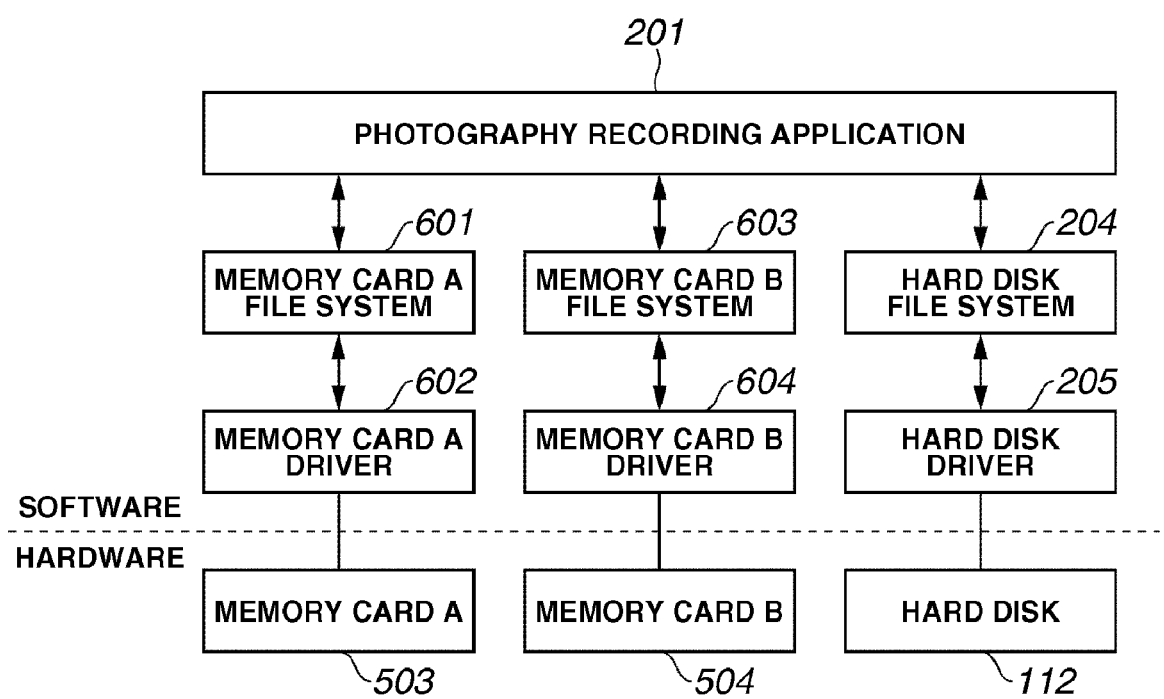
FIG. 6 illustrates an example module configuration of software relating to processing for recording captured digital image data according to the second exemplary embodiment of the present invention.

FIG. 6 illustrates an exemplary module configuration of software relating to recording of captured digital image data according to the second embodiment of the present invention. A memory card A file system 601 and a memory card B file system 603 respectively manage file information and directory information of digital image data recorded on the memory card 503 and the memory card 504. Further, the memory card A file system 601 writes and reads data per file and per directory on and from a memory card A driver 602 according to an instruction from the shooting and recording application 201. The memory card A file system 602 reads and writes data per file and per directory on and from a memory card B driver 604 according to an instruction from the shooting and recording application 201.

The memory card A driver 602 and the memory card B driver 604 are modules which detect whether the memory card 503 and the memory card 504 are connected to the digital camera 100, and also write and read data on and from the memory card 503 and the memory card 504 according to an instruction from a higher-order file system. The other modules are substantially similar to those of the first exemplary embodiment.

Figure 7:
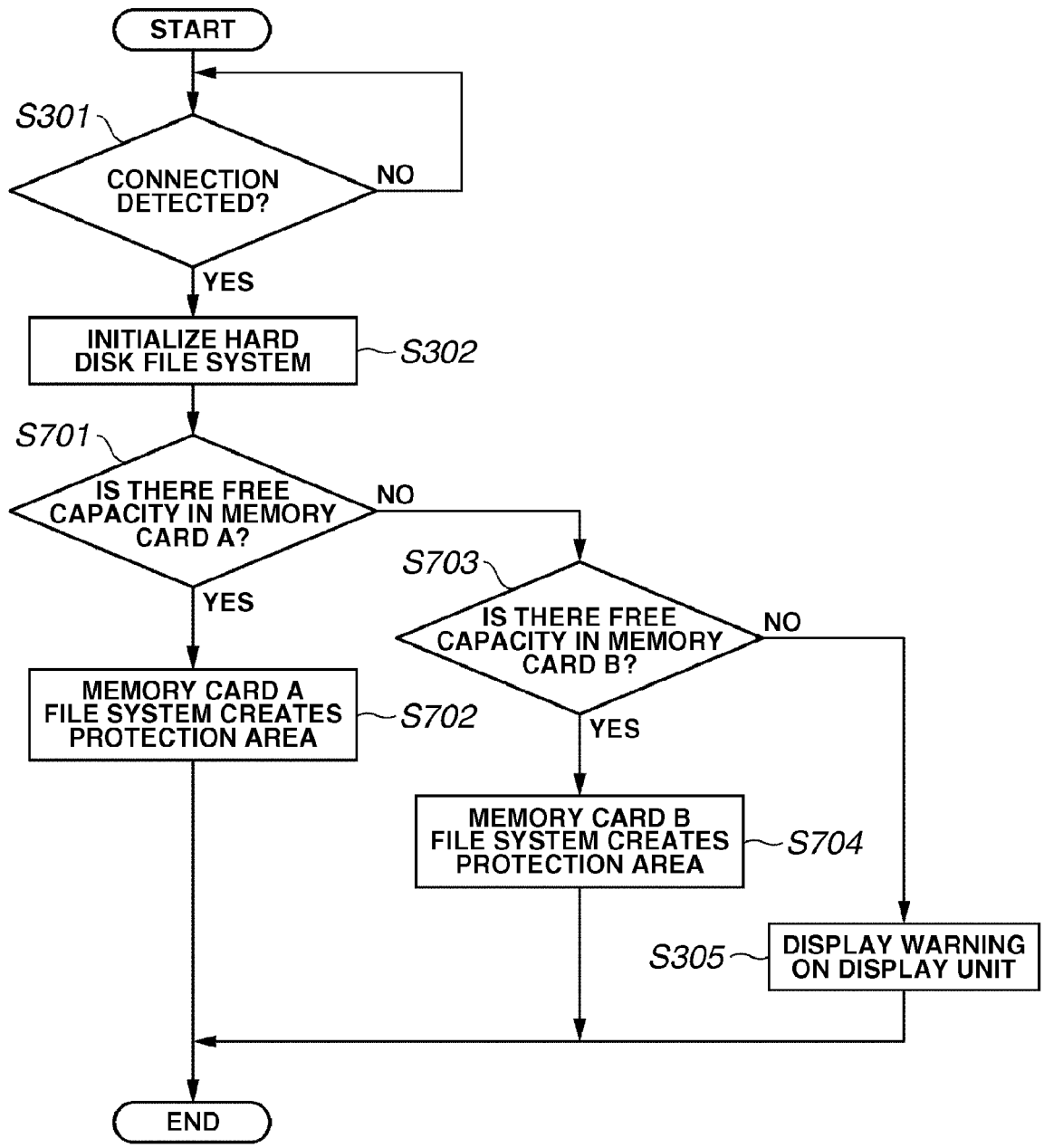
FIG. 7 is a flow chart illustrating example processing when a hard disk is connected to a digital camera according to the second exemplary embodiment of the present invention.

Now, with reference to FIG. 7, processing is described which is performed when the USB cable 111, namely, the hard disk 112, is connected to the digital camera 100 during the memory card A recording mode or the memory card B recording mode.

Steps S301 and S302 are similar to those of the first exemplary embodiment. Referring to FIG. 7, in step S701, the memory card A file system 601 detects whether a protection area of a predetermined size can be created in the memory card A 503. In the present exemplary embodiment, the predetermined size is 64 megabytes. If it is detected in step S701 that a protection area can be created in the memory card 503 (YES in step S701), the processing advances to step S702. In step S702, the memory card A file system 601 creates a protection area. The memory card A file system 601 only subtracts 64 megabytes from amount information about free capacity of the memory card A 503 managed by the memory card A file system 601. The memory card A file system 601 does not perform any processing on the memory card A driver 602 and the memory card A 503. Then, the processing ends.

On the other hand, if it is detected in step S701 that no protection area can be created in the memory card A 503 (NO in step S701), the processing advances to step S703. In step S703, the memory card B file system 603 detects whether a protection area of 64 megabytes can be created in the memory card 504. If it is detected in step S703 that a protection area of 64 megabytes can be created in the memory card 504 (Yes in step S703), the processing advances to step S704. In step S704, the memory card B file system 603 creates a protection area. The memory card B file system 603 only subtracts 64 megabytes from the amount information about the free capacity of the memory card B504 managed by the memory card B file system 603 itself. The memory card B file system 603 does not perform any processing on the memory card B driver 604 and the memory card B504. Then, the processing ends. Just as in the first exemplary embodiment, the processing for creating a protection area can also be performed when the digital camera 100 shifts to the hard disk recording mode or the simultaneous recording mode. Further, the digital camera 100 can also create a protection area if it is detected that digital image data is of a size with which the digital image data can be recorded by referring to information about a free capacity of the hard disk 112.

On the other hand, if it is detected in step S703 that no protection area can be created (No in step S703), the processing advances to step S305. The processing in step S305 is similar to that of the first exemplary embodiment. Then, the processing ends.

Figure 8:
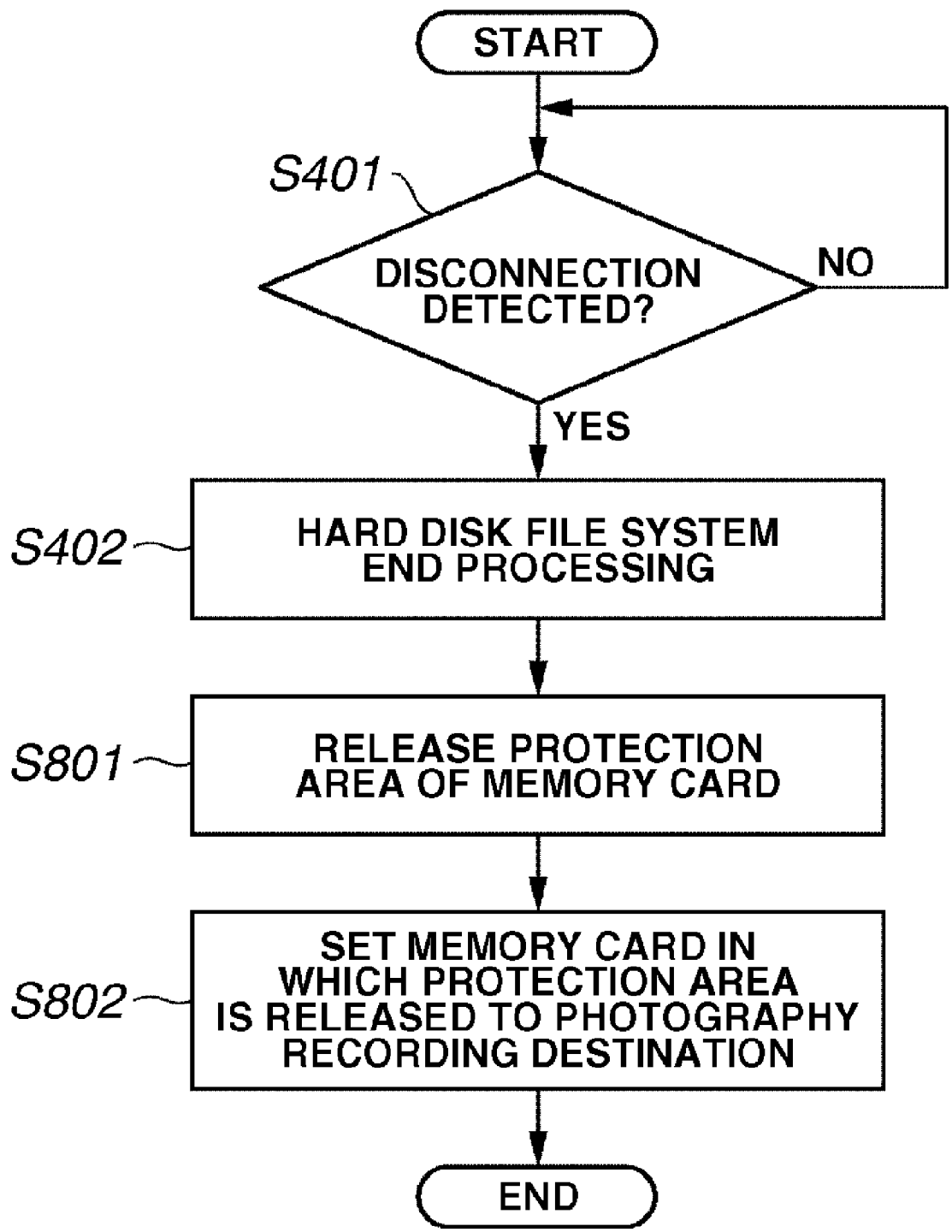
FIG. 8 is a flow chart illustrating example processing performed when the hard disk is disconnected from the digital camera according to the second exemplary embodiment of the present invention.

Now, with reference to FIG. 8, processing is described below which is performed when the USB cable 111 is disconnected. Here, it is supposed that the digital camera 100 having a protection area in the memory card A 503 or the memory card B504 is in one of the hard disk recording mode, the memory card and hard disk simultaneous recording mode, and the memory card B and hard disk simultaneous recording mode.

Steps S401 and S402 are similar to those of the first exemplary embodiment. Referring to FIG. 8, in step S801, the CPU 101 releases the protection area created in step S702 or step S704. Here, the memory card A file system 601 or the memory card B file system 603 only adds 64 megabytes to the amount information about the free capacity of the memory card managed by the memory card A file system 601 or the memory card B file system 603 itself. The memory card A file system 601 or the memory card B file system 603 does not perform any processing on the memory card driver 203 and the memory card A503 or the memory card B504.

After the processing in step S801 is performed, in relation to the higher-order shooting and recording application 201, the actual free capacity of the memory card A503 or the memory card B504 appears to have increased. Then, in step S802, the shooting and recording application 201, after receiving the notification of disconnection of the hard disk 112, sets a recording destination of the captured digital image data to the memory card A503 or the memory card B504 on which a protection area has been created. That is, the recording mode is shifted to the memory card A recording mode or the memory card B recording mode. The series of operations performed when the USB interface cable 111 is disconnected is as described above. Thus, even when the USB cable 111 is disconnected during the hard disk recording mode, the shooting and recording application 201 can surely record digital image data captured after the USB cable 111 is disconnected in the protection area of the memory card 110.

Other Exemplary Embodiments

According to the processing described in the first and the second exemplary embodiments, even when the USB cable 111 is disconnected during shooting and recording of the captured data on the hard disk 112, the image data can be surely recorded in the protection area previously created on the memory card. Accordingly, the shooting operation can be continued even immediately after the USB cable 111 is disconnected. Therefore, an important photo opportunity cannot be missed by the photographer. Further, in the case where the USB cable 111 is disconnected while shooting and recording is simultaneously performed on the hard disk and the memory card, and the capacity of the memory card has been fully consumed, the image data can be surely recorded in the protection area. In addition, the shooting operation can be continued.

The area secured as a protection area is of a size which serves as an insurance against the case where the USB cable 111 is disconnected. Actually, for the protection area, it is enough to secure an area of a size equivalent to several pieces of digital image data. More specifically, the size of the protection area can be n times as much as a maximum value of the size of captured moving image data. Alternatively, the size of the protection area can be a fixed size of 8×n bytes. Since these sizes are sufficiently smaller than the entire size of the memory card, a user may not feel anxious if the capacity of the memory card automatically decreases due to the mounting of the hard disk 112. In addition, instead of apart of a memory card, the entire capacity of the memory card can be secured as a free space. In the above-described exemplary embodiments, in step S305, a warning message is displayed to the user at the time the hard disk 112 is connected to the digital camera 100, which urges the user to create a protection area. Accordingly, the user can without failure copy the data stored on the memory card to another recording medium or erase unnecessary data before an important photo opportunity comes. Thus, the user can have a time enough to prepare a protection area before a possible photo opportunity.

In the first and the second exemplary embodiments, the memory card and the hard disk are used as a recording medium connected to the digital camera 100. However, an arbitrary kind of recording medium can be used in the present invention. For example, an optical disk and a built-in volatile memory can be used.

In the first and the second exemplary embodiments, only a memory card is used as a recording medium in which a protection area is created. However, when, for example, a plurality of memory cards can be mounted, the CPU 101 can allow the user to search and select a memory card in which a protection area can be created. In such a case, a protection area can be created in the selected memory card. Furthermore, the user can also create one continuous protection area on a plurality of memory cards.

In the first and the second exemplary embodiments, a file system is clearly classified into a memory card file system and a hard disk file system. However, in the present invention, one file system can also manage all the file information about the plurality of memory cards and the hard disk, and a common interface can be provided to the shooting and recording application 201.

The interface to the bus (line) with which the hard disk 112 and the digital camera 100 are connected and communicates with each other is not limited to a USB interface. That is, an IEEE1394 interface, an Ethernet® interface, and an IEEE802.11 interface can also be used.

Further, the present invention can be achieved by providing a system or an apparatus with a recording medium (storage medium) storing program code of software that implements the functions of the embodiments, and by reading and executing the program code stored in the storage medium with a computer of the system or the apparatus (a central processing unit (CPU) or a micro processing unit (MPU)).

In this case, the program code itself, which is read from the storage medium, implements the functions of the embodiments described above, and accordingly, the program code itself and the storage medium storing the program code constitute the present invention.

As the storage medium for supplying such program code, a flexible disk, a hard disk, an optical disk, a magneto-optical disk (MO), a compact disk read only memory (CD-ROM), a compact disk recordable (CD-R), a compact disk rewritable (CD-RW), a magnetic tape, a nonvolatile memory card, a ROM, for example, can be used.

In addition, the functions according to the embodiments described above can be implemented not only by executing the program code read by the computer, but also implemented by the processing in which an operating system (OS) or the like carries out a part of or the whole of the actual processing based on an instruction given by the program code.

Further, in another aspect of the embodiment of the present invention, after the program code read from the storage medium is written in a memory provided in a function expansion board inserted in a computer or a function expansion unit connected to the computer, a CPU and the like provided in the function expansion board or the function expansion unit carries out a part of or the whole of the processing to implement the functions of the embodiments described above.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2006-205323 filed Jul. 27, 2006, which is hereby incorporated by reference herein in its entirety.

What is claimed is:

1. A data recording apparatus comprising:
    a first recording control unit configured to control recording of data on a first recording medium connected to the data recording apparatus; and
    a second recording control unit configured to control recording of data on a second recording medium connected to the data recording apparatus;
    a detection unit configured to detect a state of connection between the data recording apparatus and the second recording medium, wherein
    the first recording control unit is configured to:
        (a) protect a free space of a predetermined size included in the first recording medium by inhibiting writing of data in the free space when it is detected that the second recording medium is connected to the data recording apparatus, and
        (b) permit writing of data in the free space when data cannot be recorded on the second recording medium.

2. The data recording apparatus according to claim 1, wherein the first recording control unit permits writing of data in the free space of the first recording medium when the detection unit detects that the second recording medium is disconnected from the data recording apparatus.

3. The data recording apparatus according to claim 1, further comprising: a setting unit configured to set a recording destination of the data, wherein the first recording control unit protects the free space of the predetermined size included in the first recording medium when the setting unit sets the second recording medium to be the recording destination of the data.

4. The data recording apparatus according to claim 1, further comprising:
    a setting unit configured to set a recording destination of the data, wherein
    the setting unit sets the first recording medium to be a recording destination of data when the detection unit detects that the second recording medium is disconnected from the data recording apparatus.

5. The data recording apparatus according to claim 1, further comprising a notification unit configured to notify that no free space exists in the first recording medium when a free space of the predetermined size does not exist in the first recording medium.

6. The data recording apparatus according to claim 1, further comprising a third recording control unit configured to control recording of data on a third recording medium connected to the data recording apparatus, wherein the third recording control unit is configured to:
    (a) protect a free space of a predetermined size included in the third recording medium by inhibiting writing of data in the free space of the predetermined size included in the third recording medium when a free space of the predetermined size does not exist in the first recording medium, and
    (b) permit writing of data into the free space of the predetermined size included in the third recording medium when data cannot be recorded on the second recording medium.

7. A method for controlling a data recording apparatus, the method comprising:

controlling recording of data on a first recording medium connected to the data recording apparatus, controlling recording of data on a second recording medium connected to the data recording apparatus, detecting a state of connection between the data recording apparatus and the second recording medium, protecting a free space of a predetermined size included in the first recording medium by inhibiting writing of data in the free space when the second recording medium is connected to the data recording apparatus, and permitting writing of data in the free space when data cannot be recorded on the second recording medium.

8. A computer readable medium containing computer-executable instructions for controlling a data recording apparatus, the medium comprising:

computer-executable instructions for controlling recording of data on a first recording medium connected to the data recording apparatus, computer-executable instructions for controlling recording of data on a second recording medium connected to the data recording apparatus, computer-executable instructions for detecting a state of connection between the data recording apparatus and the second recording medium, computer-executable instructions for protecting a free space of a predetermined size included in the first recording medium by inhibiting writing of data in the free space when the second recording medium is connected to the data recording apparatus, and computer-executable instructions for permitting writing of data in the free space when data cannot be recorded on the second recording medium.

* * * * *